United States Patent
Lanyi et al.

(10) Patent No.: US 8,133,298 B2
(45) Date of Patent: Mar. 13, 2012

(54) BLAST FURNACE IRON PRODUCTION WITH INTEGRATED POWER GENERATION

(75) Inventors: Michael Dennis Lanyi, Kempton, PA (US); Joseph Anthony Terrible, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 264 days.

(21) Appl. No.: 12/329,010

(22) Filed: Dec. 5, 2008

(65) Prior Publication Data

US 2010/0064855 A1 Mar. 18, 2010

Related U.S. Application Data

(60) Provisional application No. 60/992,754, filed on Dec. 6, 2007, provisional application No. 61/086,237, filed on Aug. 5, 2008.

(51) Int. Cl.
*C21B 7/00* (2006.01)
(52) U.S. Cl. ............... 75/460; 75/463; 75/468; 60/775
(58) Field of Classification Search ............... 75/463, 75/460, 468; 60/775
See application file for complete search history.

(56) References Cited

U.S. PATENT DOCUMENTS

| | | | |
|---|---|---|---|
| 2,593,257 A | 4/1952 | Bradley | |
| 3,594,985 A | 7/1971 | Ameen et al. | |
| 4,074,983 A | 2/1978 | Bakke | |
| 4,153,426 A | 5/1979 | Wintrell | |
| 4,421,553 A | 12/1983 | Ponghis et al. | |
| 4,725,381 A | 2/1988 | Pinto | |
| 4,917,727 A * | 4/1990 | Saito et al. | 75/460 |
| 4,921,532 A | 5/1990 | Corbett et al. | |
| 5,039,318 A | 8/1991 | Johansson | |
| 5,084,072 A | 1/1992 | Reynolds | |
| 5,244,489 A | 9/1993 | Grenier | |
| 5,268,010 A | 12/1993 | Zengerer | |
| 5,268,019 A * | 12/1993 | Rathbone | 75/466 |
| 5,437,706 A | 8/1995 | Edelson | |
| 5,582,029 A | 12/1996 | Occhialini et al. | |
| 5,582,036 A * | 12/1996 | Drnevich et al. | 62/656 |
| 5,643,354 A | 7/1997 | Agrawal et al. | |
| 6,045,602 A * | 4/2000 | Shah et al. | 75/466 |
| 6,051,048 A | 4/2000 | Keenan | |

(Continued)

FOREIGN PATENT DOCUMENTS

JP 2000-192119 A 7/2000

(Continued)

OTHER PUBLICATIONS

Biswas, Anil D.; "Reactions in the Blast Furnace;" Chapter 7; Principles of Blast Furnace Ironmaking; 1981; p. 266-303.

(Continued)

*Primary Examiner* — George Wyszomierski
*Assistant Examiner* — Tima M McGuthry Banks
(74) *Attorney, Agent, or Firm* — Michael K. Boyer

(57) ABSTRACT

An integrated system for blast furnace iron making and power production based upon higher levels of oxygen enrichment in the blast gas is disclosed. The integrated system leads to; 1) enhanced productivity in the blast furnace, 2) more efficient power production, and 3) the potential to more economically capture and sequester carbon dioxide. Oxygen enhances the ability of coal to function as a source of carbon and to be gasified within the blast furnace thereby generating an improved fuel-containing top gas.

20 Claims, 6 Drawing Sheets

U.S. PATENT DOCUMENTS

| | | | |
|---|---|---|---|
| 6,077,325 A * | 6/2000 | Margan et al. | 75/300 |
| 6,089,040 A | 7/2000 | Guillard | |
| 6,110,256 A | 8/2000 | Reynolds et al. | |
| 6,152,984 A | 11/2000 | Drnevich | |
| 6,216,441 B1 | 4/2001 | Stats | |
| 6,294,003 B1 | 9/2001 | Ray | |
| 6,572,674 B1 | 6/2003 | Avart et al. | |
| 7,318,857 B2 | 1/2008 | Ray et al. | |
| 7,784,262 B2 * | 8/2010 | Leser et al. | 60/39.182 |
| 2004/0020239 A1 * | 2/2004 | LaForce et al. | 62/648 |
| 2006/0188435 A1 | 8/2006 | Herb | |
| 2006/0261265 A1 | 11/2006 | Ray et al. | |
| 2007/0034704 A1 * | 2/2007 | Hu et al. | 237/12.1 |
| 2009/0223229 A1 * | 9/2009 | Wang et al. | 60/780 |
| 2010/0146982 A1 * | 6/2010 | Lanyi et al. | 60/772 |
| 2010/0326084 A1 * | 12/2010 | Anderson et al. | 60/775 |

FOREIGN PATENT DOCUMENTS

WO    9728284    8/1997

OTHER PUBLICATIONS

Lanyi et al; U.S. Appl. No. 60/992,754, filed Dec. 6, 2007; Enhanced Blast Furnace Iron Production with Integrated Power Generation.

Lanyi et at; U.S. Appl. No. 61/086,237, filed Aug. 5, 2008; Blast Furnace Iron Production with Integrated Power Generation.

Lanyi et al; U.S. Appl. No. 12/630,256, filed Dec. 3, 2009; Blast Furnace Iron Production with Intdgrated Power Generation.

Liu, Yuncai; "Practice of the High PCI Rate Operation of the Blast Furnace;" Iron and Steel; Issue 6, vol. 16; (Jun. 1981) p. 1-14.

You, Wulin; "Gas Utilization After the Oxygen Enrichment and PCI Operation were Adopted for the Blast Furnaces;" Iron and Steel, Issue 4, vol. 27; (Apr. 1992); p. 1-6.

Zhang, et al; "Theoretical Analysis on Coal Dust in Blast Furnace by High Oxygen Enrichment and High PCI Operation;" Iron and Steel; Issue 10, vol. 27; (Oct. 1992); p. 1-13.

Wingrove, et al; "Developments in Ironmaking and Opportunities for Power Generation;" BOC Gases; 1999 Gasification Technologies Conference; (Oct. 17-20, 1999).

Jianwei, et al; "Oxygen blast furnace and Combined cycle (OBF-CC)—an efficient iron-making and power generation process;" Science Direct; Energy 28 (2003) p. 825-835.

Choi et al; "CO2 Reduction by Blast Furnace Top Gas Recycling Combined with Waste Hydrocarbon Gasification;" Studies in Surface Science and Catalysis 153; Elsevier B.V.; (2004); p. 125-130.

Dang et al; "Research on Low Fuel Rate and High Pulverized Coal Injection (PCI) Rate of the High Efficiency Blast Furnace;" Iron and Steel; Issue 2, vol. 40; (Feb. 2005); p. 1-10.

Xu et al; "Practice on High Pulverized Coal Injection (PCI) Rate Operation of Blast Furnace," Iron and Steel; Issue 9, vol. 40; (Sep. 2005); p. 1-13.

Lampert; "Comparative analysis of energy requirements of CO2 removal from metallurgical fuel gases;" Elsevier; Energy 32 (2007) p. 521-527.

Ariyama et al; "Optimization of Ironmaking Process for Reducing CO2 Emissions in the Integrated Steel Works;" ISIJ International, vol. 46 (2006), No. 12; p. 1736-174.

Corbett et al; "Blast Furnace Efficiency Gains and Medium BTU Gas Production Using FAXTOX Technology;" AISTech 2006 Proceedings—vol. 1; p. 381-387.

Sierra Energy Brochure; FASTOX flexible Accelerated Steam/Oxygen Blast Furnace; 2008 Sierra Energy.

A Selexol Process; Gas Processing (2002); UOP, LLC.

Poos et al; "Potential and Problems of High Cola Injection Rates," Ironmaking Conference Proceedings (1990).

Pukhov, A.P., et al; "Introduction of Blast Furnace Technology Involving Injection of Hot Reducing Gases"; Published in Steel in the USSR; vol. 21 No. 8; pp. 333-338; 1991.

* cited by examiner

BLAST FURNACE IRON PRODUCTION WITH INTEGRATED POWER GENERATION

CROSS-REFERENCE TO RELATED APPLICATIONS

This application claims the benefit of Provisional Application No. 60/992,754, filed Dec. 6, 2007, and No. 61/086,237, filed on Aug. 5, 2008. The disclosure of these provisional applications is hereby incorporated by reference.

BACKGROUND OF THE INVENTION

This particular invention relates to enriching air supplied to a coal-injected iron-making blast furnace and using the flue or top gas from the furnace to generate power.

Methods for combining iron production and power generation are described in "Oxygen blast furnace and combined cycle (OBF-CC)—an efficient iron-making and power generation process", Y. Jianwei et al., Energy 28 (2003) 825-835.

Air Separation Units (ASUs) and methods for making oxygen therein are described in U.S. Pat. No. 5,268,019; hereby incorporated by reference. Methods for combining iron making process with an ASU are described in U.S. Pat. No. 5,582,029 and WO 9728284-A1.

Methods for combining an ASU and power generation are described in "Developments in iron making and opportunities for power generation", 1999 Gasification Technologies Conference, San Francisco, Calif., Oct. 17-20, 1999. This publication also describes using coal in iron production in order to reduce the amount of coke that is required.

U.S. Pat. No. 6,216,441 B1 discloses removal of inert gases from flue or top gas prior to combustion of it in a gas turbine or combined cycle power plant.

The disclosure of the previously identified patents and patent applications is hereby incorporated by reference.

There is a need in this art for an integrated system that combines coal gasification and oxygen enriched iron production from a blast furnace with power generation, and, if desired, carbon dioxide removal and sequestration.

BRIEF SUMMARY OF THE INVENTION

The instant invention solves problems associated with combining conventional iron production methods with higher efficiency combined cycle power production from combustion of the top gas by providing an integrated system based upon maximizing the heat value in the top gas, and simultaneously increasing the productivity of the furnace hot metal production. The integrated system includes operating the blast furnace in a manner wherein at least one of the following is achieved: a) pulverized coal injection (PCI) rate is maximized and combined with b) "super-enrichment" of air supplied to the blast furnace with oxygen (e.g., via an ASU, a membrane, among other suitable means for generating oxygen) where 'super-enrichment' of the blast air with oxygen means enriching the blast to an oxygen concentration above about 32% and up to about 70% by molar volume (e.g., at least 40% to about 60%), c) steam is added to the oxygen enriched blast to enhance production of hydrogen as well as control temperature in the lower part of the blast furnace (e.g., steam can be extracted from the combined cycle (CC) steam turbine), and d) coke consumption rate is minimized to the extent that it is sufficient to provide support and gas permeability during the ore reduction process. The super enriched air (and if desired steam) enhance the coal gasification in the furnace to produce reducing gases of CO and $H_2$, thus replacing more expensive metallurgical coke. The super-enriched air also permits at least one of: a) increasing in the amount of coal used in the furnace, b) more complete gasification that increases the concentration of reducing gases in the top gas, c) improving the iron-making productivity of the given furnace, and d) generating a higher calorific value, or fuel-containing top gas that can be matched to a downstream process for maximum efficiency of downstream process operation (e.g., in some cases, without supplemental fuel).

Maximizing the PCI injection leverages the efficient desulfurizing and energy converting characteristics of the blast furnace to produce in combination with downstream top gas treatment and conversion processes and equipment at least one of power, syngas, steam, among other benefits. The PCI injection can be combined with super-enriched air that can obviate the need for the hot blast stoves.

One aspect of the invention relates to iron production and coal gasification that is integrated with combined cycle power generation.

Another aspect of the invention relates to iron production and coal gasification where oxygen injected into the blast furnace is generated from an ASU that is also integrated into the combined cycle gas turbine to provide nitrogen for cooling and mass enhancing, and excess compressed air from the compressor supplying combustion air to the gas turbine is supplied to the ASU.

Another aspect of the invention relates to iron production and coal gasification that is integrated with combined cycle power generation and carbon dioxide capture for possible sequestration both of which are enabled and enhanced by the reduced concentration of $N_2$ in the topgas resulting from the use of super enriched oxygen blast. Capturing or removing carbon dioxide can increase the fuel value of the topgas, reduce the amount of gas to be compressed in subsequent processes, reduce or eliminate the amount of carbon dioxide supplied to the furnace in an optional recycle loop, among other benefits.

A further aspect of the invention relates to iron production and coal gasification that is integrated with combined cycle power generation and carbon dioxide capture, with the additional inclusion of a shift reactor prior to the carbon dioxide removal and capture step, so as to enable greater proportions of carbon to be removed and captured.

Another aspect of the invention relates to iron production and coal gasification that is integrated with combined cycle power generation and $CO_2$ capture, taking advantage of the steam generated from the heat contained in the exhaust from the gas turbine or the nitrogen from the ASU to drive the shift reactor or a $CO_2$ removal (e.g., sequestration) process.

A further aspect of the invention relates to iron production and coal gasification that is integrated with top gas cleanup and/or $CO_2$ removal for production of syngas.

One aspect of the invention relates to a method for producing iron comprising: introducing iron ore, coke and coal into a blast furnace, whereby the coal is gasified by introducing super-enriched air into a blast furnace, and recovering from the blast furnace a top gas, using the top gas to generate power; and, recovering hot metal from the blast furnace.

Another aspect of the invention relates to a method for generating power comprising:

providing a top gas, or portion of top gas, from a blast furnace comprising carbon monoxide, carbon dioxide, hydrogen, nitrogen in concentration such that it has a calorific value matched, without supplemental fuel, to fall within the required fuel value operating range of a downstream gas turbine, introducing the gas into a gas turbine under conditions sufficient to generate power, and;

introducing the exhaust from the gas turbine into a heat recovery steam generator under conditions sufficient to generate power.

A further aspect of the invention relates to a method for gasifying coal and producing iron comprising:

introducing coal into an ironmaking blast furnace, and;

introducing air enriched in oxygen into the blast furnace, wherein the conditions within the blast furnace are sufficient to convert at least a portion of the coal into a gas comprising carbon monoxide, carbon dioxide and hydrogen;

removing at least a portion of the carbon dioxide from the gas, supplying the gas to at least one of a combined cycle power generation system, a shift reactor and the ironmaking blast furnace; and, recovering iron from the ironmaking blast furnace.

Figure 1:
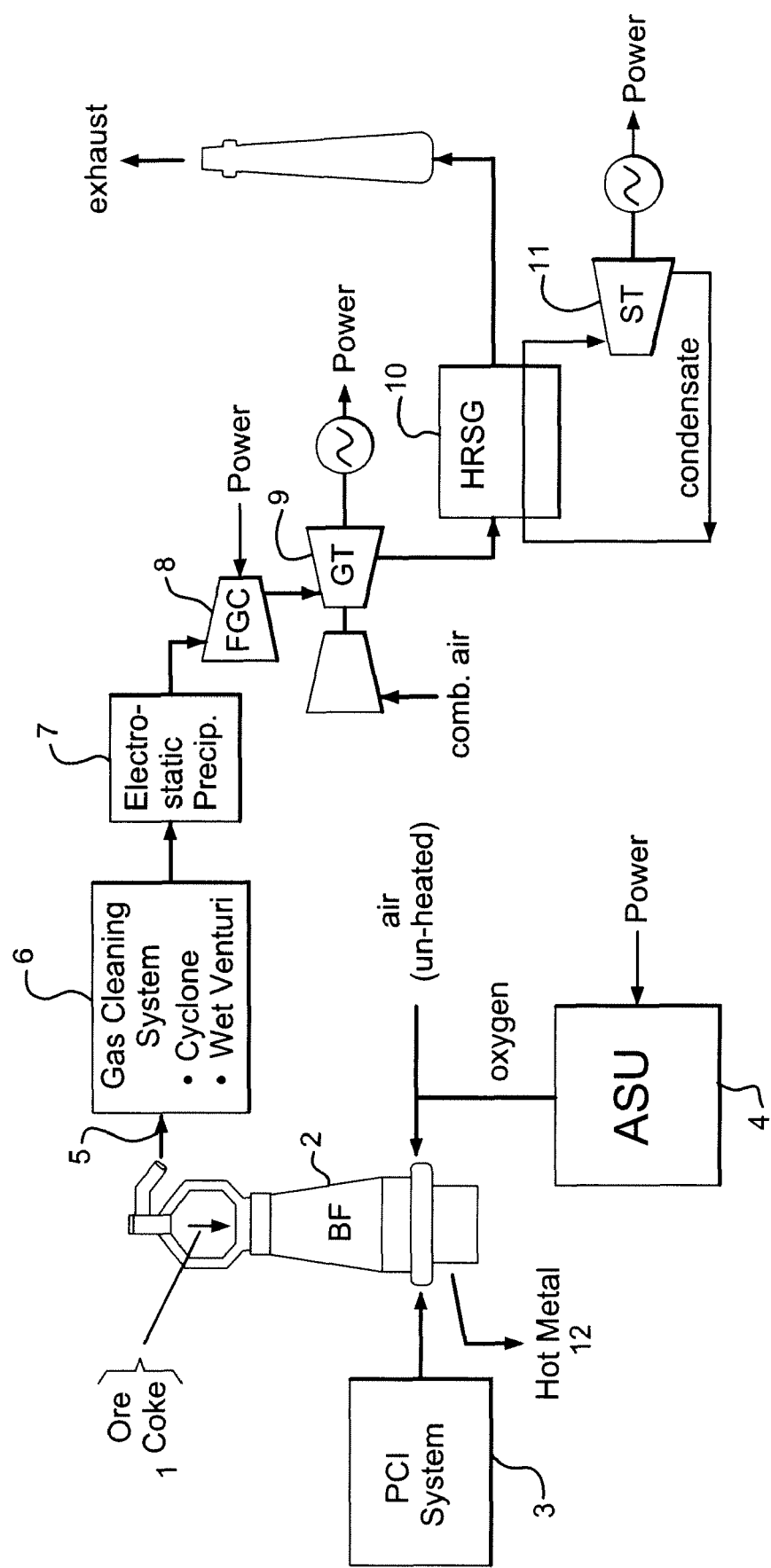
FIG. 1 is a schematic illustration of one aspect of the invention that employs coal gasification and combined cycle power generation in connection with Blast Furnace iron production.

The apparatus, components, systems and methods illustrated in these Figures can be employed individually or in combination to obtain additional aspects of the invention that are not illustrated by the Figures.

DETAILED DESCRIPTION OF THE INVENTION

The instant invention relates to apparatus, processes and compositions for providing an integrated system that utilizes oxygen enrichment of air supplied to a blast furnace (e.g., via an ASU) to efficiently combine coal gasification and blast furnace iron production. The integrated system gasifies coal in situ within the iron blast furnace and produces a flue or furnace top-gas having improved utility for power generation and, if desired, from which carbon dioxide can removed and sequestered.

Additional oxygen beyond that which is normally supplied to the air blast is either directly injected or combined with the blast air being supplied to the blast furnace to enhance the effectiveness of the blast furnace to accept a relatively large amount of injected fossil fuels, for example coal from a pulverized coal injection system (PCI), and/or to enable more pulverized coal to be injected. Such a PCI system reduces the amount of coke that is required for iron production in a blast furnace. In addition, supplying oxygen enriched air to the blast furnace can produce: 1) a flue or top-gas that has reduced nitrogen content and increased fuel or calorific value, 2) a top gas that has enhanced value for power generation, 3) a top gas that is compatible with gas turbine power generators, 4) a top gas obtained by in situ coal gasification within the blast furnace, among other benefits. In a marked improvement over conventional methods, the integrated system of the instant invention obtains a top gas that can have an increased concentration of hydrogen and carbon monoxide and, in some cases, a reduced amount of nitrogen.

The instant invention permits controlling and selecting a desired economic base of operation that is achieved by valuing the benefit and cost of the following variables: coke, coal, iron, oxygen, power and stove utilization (i.e., hot blast). For a given cost of coke, oxygen and coal, the optimum value of iron and power can be selected. Generally, increasing the amount of coal introduced into the blast furnace will increase the amount of oxygen used, but reduce the amount of coke employed and in turn reduce the cost of iron production. Similarly, increasing the amount of coal will also increase the amount of oxygen used and lower the hot blast temperature (e.g., the amount of heat supplied from the stoves can be reduced), and increase the amount of power that can be generated. Depending upon the relative economic value of the foregoing variables, it may be possible to eliminate the hot blast (stoves) and hence use the energy previously consumed by the stoves to generate power, or for operating a water shift reactor, carbon dioxide removal, among other systems.

If desired, the oxygen used for enriching air that is introduced into a blast furnace can be supplied from any suitable gas separation system such as cryogenic distillation including an ASU, a membrane (e.g., an ion transport membrane), pressure vacuum swing adsorption (PVSA), among other systems suitable for generating an oxygen containing stream that can be used for enriching air. As a result of employing higher levels of oxygen enrichment, the oxygen enriched blast may be supplied directly to a blast furnace at ambient temperature conditions thereby obviating, if desired, the need for hot blast stoves (e.g., stoves that use top gas to heat air prior to introduction to the blast furnace), and permitting the energy typically consumed by the hot blast stoves to become additionally available for generating power. Information relating to introducing oxygen enriched air into a PCI blast furnace can also be found in A. Poos and N. Pongis, "Potentials and problems of high coal injection rates", 1990 Ironmaking Conference Proceedings.

While any suitable ASU can be employed, an example of suitable ASUs are those supplied commercially by Air Products And Chemicals, Inc., Allentown, Pa. Suitable ASUs are also described in U.S. Pat. No. 5,268,019; hereby incorporated by reference. A gas separation system such as an ASU can produce an oxygen containing stream having an oxygen concentration of from about 40 to less than about 100% by volume. An oxygen containing stream from the ASU is blended or combined with air (either heated or ambient) to provide a predetermined concentration of oxygen to the blast furnace (e.g., from about 35 to up to nearly pure oxygen, but more typically between about 40 to about 70% oxygen). An oxygen containing stream from the ASU can also be supplied to the duct burner of the HRSG to enhance combustion of relatively low-calorific topgas (e.g. for improving steam generation). If desired, nitrogen produced from the ASU can be supplied to a gas turbine (e.g., as described below a gas turbine used to generate power from the blast furnace top gas), in order to increase the effectiveness of the turbine and to maintain proper combustion temperature and mass flow volume. Similarly, excess compressed air generated by the feed compressor to the gas turbine can be extracted and supplied to the ASU in order to increase the effectiveness of the ASU, or the compressed air can be used to supplement or supplant a air that is supplied to the blast furnace stoves (e.g., air that is introduced into the stoves by an air blower). Power generated from a generator driven by a gas or steam turbine can in turn be supplied to the ASU.

If desired, the oxygen enriched air being supplied to a fossil fuel injected blast furnace can be modified by introducing steam (e.g., steam generated in connection with power generation described below). Steam can be combined with the oxygen enriched air or supplied separately to the PCI blast furnace. Introducing steam to the blast furnace can have two beneficial and simultaneous effects. First, it can be used to moderate the flame temperature in the lower part of the blast furnace which might otherwise be too high due to oxygen enrichment. Second, the reaction of steam with the injected pulverized coal and hot coke present in the lower part of the blast furnace will increase the amount of hydrogen (and in some cases carbon monoxide) in the gas produced within the blast furnace. This additional hydrogen gas specie can then participate in driving iron reduction while also enhancing the top gas calorific content which, in turn, makes the top gas more useful for power generation (e.g., in combined cycle power generation). While any suitable concentration of steam can be employed, typically the amount of steam ranges from 10 up to 250 grams/Nm3 of blast volume (e.g., from about 50 to 150 grams/Nm3 and in some cases from about 20 to about 60 grams/Nm3 of blast volume)

In one aspect of the invention, the oxygen enriched air further comprises steam, at least one member selected from the group consisting of carbon monoxide, carbon dioxide and hydrogen. Oxygen can be obtained from an ASU and carbon monoxide, carbon dioxide and hydrogen obtained by recycling a portion of the top gas. As a result, a top gas that is substantially free of nitrogen can be produced. By "substantially free" it is meant that the top gas comprises less than about five (5) percent nitrogen.

The instant invention can permit lowering the temperature of the blast (e.g., comprising heated oxygen enriched air), that is introduced into the furnace from a typical hot blast temperature of about 1100 to 1150 C, to 850 C and in some cases to about 600 C. Generally, a lower blast temperature will depend upon and employ an increased amount of oxygen.

The temperature of the oxygen enriched air blast-, PCI rate, coke rate, hot metal flow or release rate, and oxygen/steam concentration can be controlled in order to obtain a top gas having a desired calorific value. Typically the calorific value of the top gas will range from about 110 to about 170 btu/scf (e.g., the calorific value can vary depending upon the concentration of oxygen used in the air blast such that the top gas calorific value may vary from about 110 to about 130 btu/scf when the oxygen enriched air comprises about 40 vol. % oxygen to about 135 to about 170 btu/scf when the enriched air comprises about 60 vol % oxygen).

One aspect of the invention relates to removing carbon dioxide from the top gas. Any suitable method can be employed for removing carbon dioxide from the top gas. In one aspect of the invention, the carbon dioxide is removed by using stripping absorbent beds such those as described in U.S. Pat. No. 5,582,029; hereby incorporated by reference. In another aspect of the invention, carbon dioxide is removed by being exposed to a solution comprising MEA (e.g., a solution comprising about 20% MEA), among other suitable solutions. By removing carbon dioxide from the top gas, the instant invention permits controlling the amount of carbon dioxide released into the environment as well as provides a top gas having improved fuel value for subsequent power generation, among other uses.

If desired, prior to removing the carbon dioxide from the top gas, carbon monoxide in the top gas can be converted to carbon dioxide by a shift reactor. That is, a reactor wherein carbon monoxide and water are converted into carbon dioxide and hydrogen (e.g., as described in U.S. Patent Application Publication No. US20060188435A1 and U.S. Pat. No. 4,725, 381A; both hereby incorporated by reference). The carbon dioxide can be removed in the manner described above and the remaining hydrogen employed for generating power, purifying petroleum products, supplied to a fuel cell for generating power, among other uses. Alternatively, the top gas can be converted into ammonia, methanol, among other products, in addition to or instead of being used for generating power.

In another aspect of the invention, the top gas can used for generating power. While the top gas can be used in any suitable power generation system, an example of a suitable combined cycle power generation system is disclosed in U.S. Pat. No. 6,216,441 B1 (hereby incorporated by reference). The top gas can be combusted in a gas turbine and/or a heat recovery steam generator in order to generate power. If desired, carbon dioxide can be removed (and, if desired, sequestered, used in subsequent chemical processes, among other uses), from the top gas prior to introducing the top gas to the power generation system. Capturing CO2 prior to combustion is much more desirable than capturing CO2 from the exhaust gas of the HRSG where the CO2 content of the gas would be more dilute and the exhaust gas would contain O2.

Figure 3:
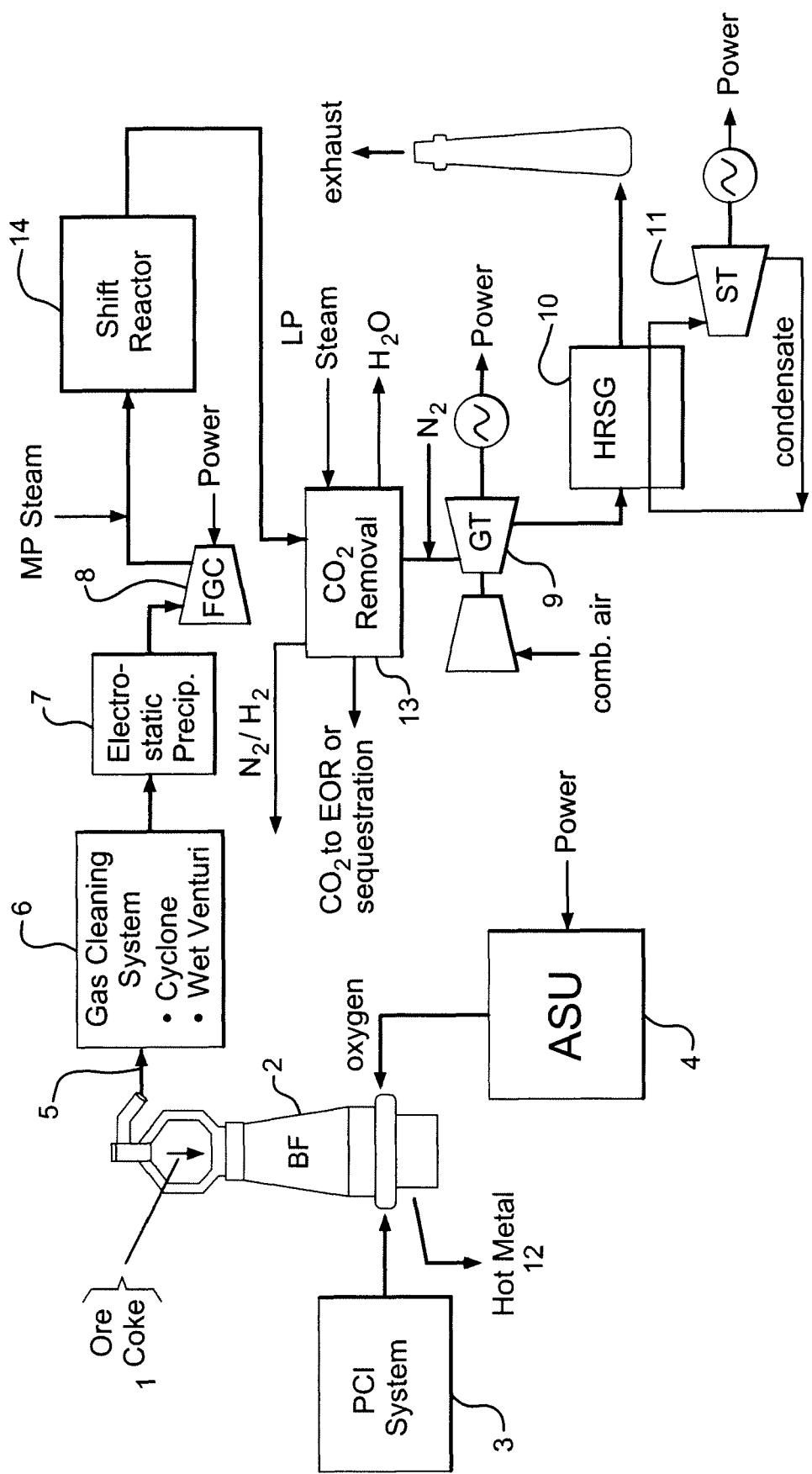
FIG. 3 is a schematic illustration of yet another aspect of the invention that employs coal gasification and combined cycle power generation together with carbon dioxide capture and removal (for possible sequestration) that is enhanced by the inclusion of a shift reactor prior to the carbon dioxide capture and removal step.

In one aspect of the invention, exhaust emitted from the power generation system is substantially free of carbon dioxide. By "substantially free" of carbon dioxide it is meant that the exhaust contains less than about five vol. % carbon dioxide. The exhaust can be substantially free of carbon dioxide and carbon monoxide by employing the previously described water shift reactor to convert carbon monoxide and water into carbon dioxide and hydrogen prior to the CO2 removal process (e.g., a water shift process is performed prior to CO2 removal such as illustrated in FIG. 3).

In a further aspect of the invention, a series of gas and steam turbines can be employed for generating power. The number of turbines, calorific value of the top gas, ratios/rates of materials supplied to the turbines, and supplemental fuel gas can be controlled in order to maximize the economic value of the inventive method and system (e.g., in one aspect to maximize the amount of power generated).

In one aspect of the invention, the power generation system can be operated without supplying supplemental quantities of fuel gas from an external source (sometimes referred to as "trim fuel"). Typically, in this aspect of the invention the gas turbine and the HRSG will be operated with less than about ten percent (10%) of the calorific value of the gas being obtained from externally generated or supplied fuel gas (e.g., natural gas, carbon monoxide, among other fuels). However, the instant invention does not preclude usage of supplemental fuels.

Certain aspects of the invention are illustrated by the drawings. Referring now to the drawings, FIG. 1 illustrates one aspect of the invention comprising an integrated iron production and coal gasification system wherein the amount of coke 1 introduced into a blast furnace (BF) 2 is reduced due to implementation of a pulverized coal injection (PCI) system 3. Oxygen enriched air is supplied by combining air with oxygen generated by an air separation unit (ASU) 4. The flue or top gas 5 emitted from the blast furnace 2 is collected and cleaned in a gas cleaning system 6 (e.g., by cyclone or wet venturi system). Following the cyclone and wet scrubbing system, any additional particulates can be removed from the top gas by additionally passing it through an electrostatic precipitator 7 making (and ensuring that) it is adequately clean for use in compressors and gas turbines. The top gas is then compressed in a flue gas compressor (FGC) 8 and introduced into a gas turbine (GT) 9 thereby generating power. The combusted top gas/air mixture, released from the gas turbine 9, is then introduced into a heat recovery steam generator (HRSG) 10 to make steam through thermal transfer. The steam is passed through a steam turbine (ST) 11 to generated power. In comparison to traditional burning of blast furnace top gas in a steam boiler power station, the combination of combined cycle power generation (i.e., using both gas and steam turbine generation of power as described above), can provide more efficient power production from a given amount of top gas energy.

In the aspect of the invention illustrated in FIG. 1 (and other aspects of the invention), the amount of hot metal 12 produced can be increased. Typically the usage of coke is less than about 300 kg per metric ton of hot metal and the coal rate is at least about 200 kg per metric ton of hot metal (e.g., about 0.5 kg of carbon per kg of iron produced).

Figure 2:
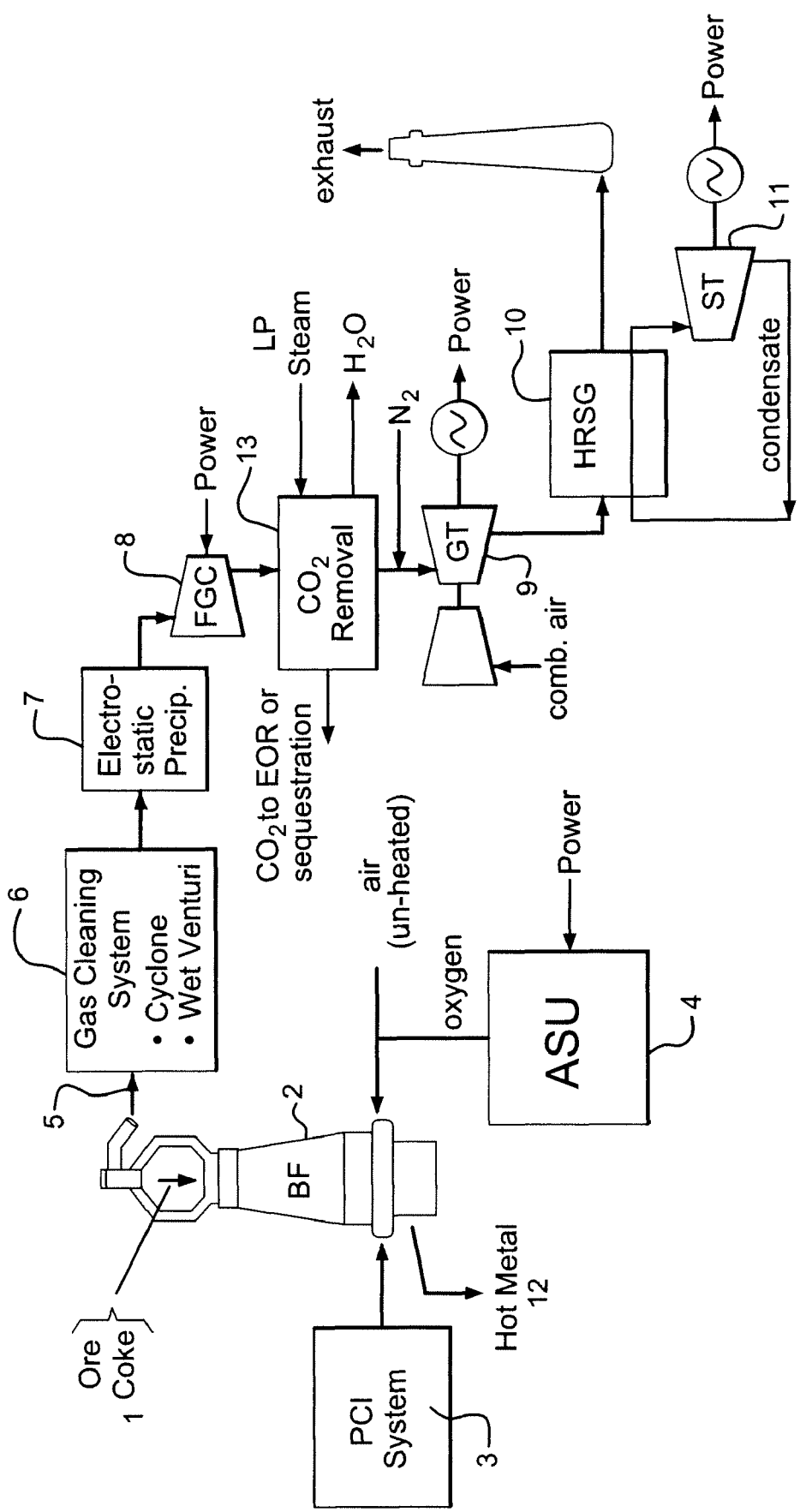
FIG. 2 is a schematic illustration of another aspect of the invention that employs coal gasification and combined cycle power generation and carbon dioxide capture and removal (for possible sequestration) in conjunction with Blast Furnace iron production.

FIG. 2 illustrates another aspect of the invention wherein the system of FIG. 1 is modified to include a system 13 for removing carbon dioxide prior to introducing the top gas to the gas turbine 9. While any suitable system can be used for removing carbon dioxide, one example of a suitable system comprises the use of a physical solvent such as commercially available SELEXOL® system to capture and remove the carbon dioxide from the stream of gas. Compressed top gas from the FGC 8 containing carbon dioxide is introduced to the carbon dioxide removal system 13. The removal system 13 receives low pressure (LP) steam and produces carbon dioxide and water (if desired, the LP steam can be supplied by the HRSG 10). The carbon dioxide can be recovered as a product, sequestered, and or submitted for other uses known for carbon dioxide (such as for use in enhanced oil recovery (EOR)). In one aspect of the invention, nitrogen as a diluent (e.g., from the ASU 4) can be introduced at any suitable location such as after carbon dioxide removal, into the gas turbine 9 for flame cooling in the gas turbine and mass flow enhancement.

FIG. 3 illustrates another aspect of the invention wherein the system of FIG. 2 is modified to include a shift reactor 14. Typically, the reactor 14 is located in the system prior to carbon dioxide removal 13. The reactor 14 combines steam (e.g., from the HRSG 10), with carbon monoxide in the top gas to produce carbon dioxide and hydrogen. By including a shift reactor 14 in the process flow ahead of the carbon dioxide removal step 13, more of the carbon-containing gas species are readied for removal and capture prior to final exhausting of the combustion products from the entire system. By this means, a greater proportion of the carbon dioxide can be removed in the subsequent system 13 (e.g., Selexol® process). Furthermore, the increased concentration of hydrogen improves the fuel value of the remaining gas which can then be used for power generation, among other uses. If desired, a stream comprising hydrogen and nitrogen can be obtained from the carbon dioxide removal system 13.

Figure 4:
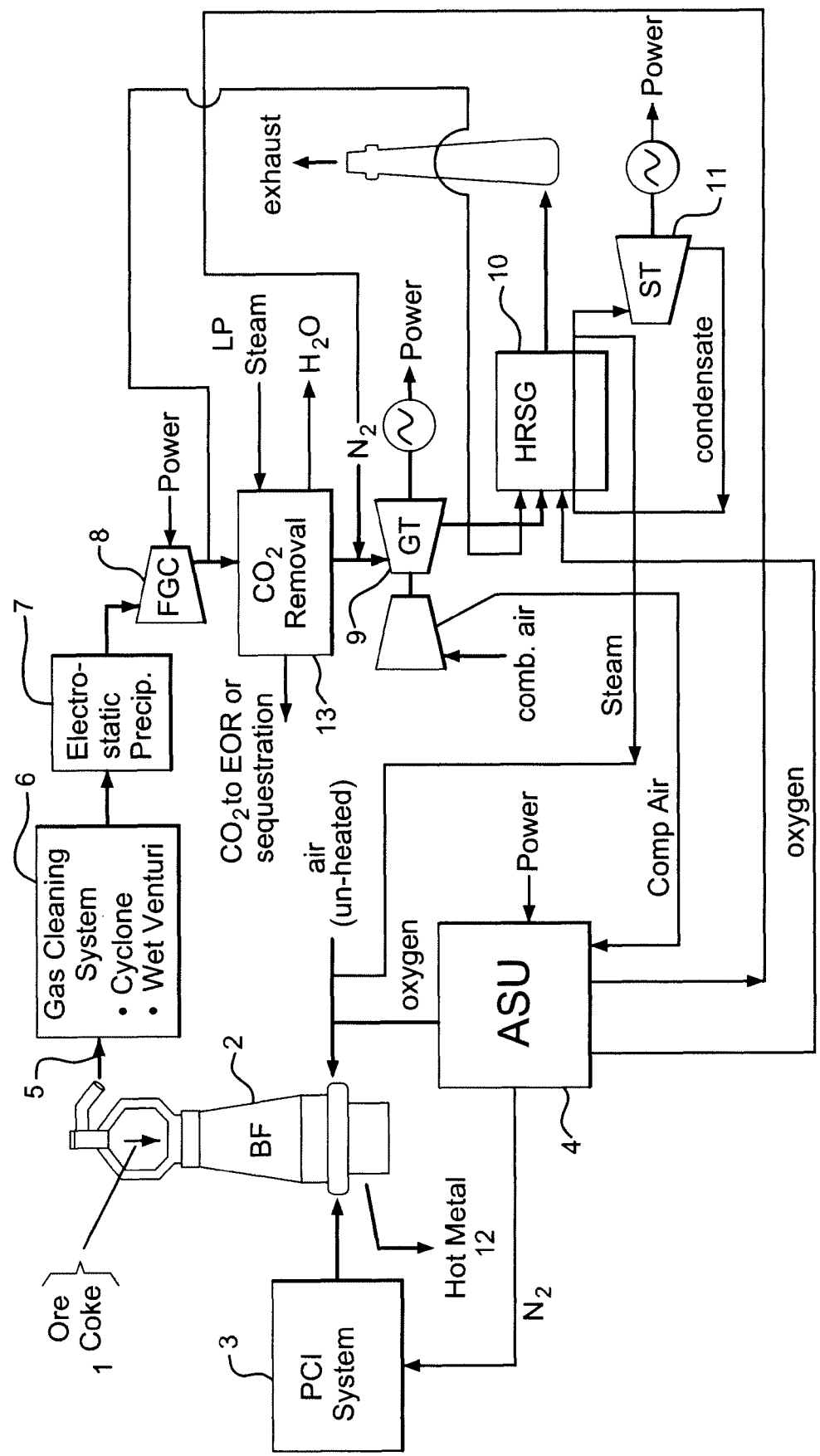
FIG. 4 is a schematic illustration of another aspect of the invention that employs nitrogen from an ASU to assist in powering a gas turbine and oxygen from the ASU to assist in combusting at least a portion of the top gas in a HRSG.

FIG. 4 illustrates another aspect of the invention wherein the system of FIG. 2 integrates the HRSG 10, and the oxygen and nitrogen produced by the ASU 4 with other components of the system. Nitrogen produced by the ASU 4 can be supplied to the PCI system 3 in order to balance mass flow, remove water, among other utilities. Nitrogen produced by the ASU 4 can also be supplied to the gas turbine 9 in order to enhance the effectiveness of the turbine. In addition, the effectiveness of the ASU can be increased by receiving excess compressed gas, if any, exiting from the compressor feeding combustion air to the gas turbine 9. In addition to the previously described uses, oxygen from the ASU 4 can also be supplied to the HRSG in order to enhance the effectiveness of combustion of any excess top gas (e.g., gas not directed to the gas turbine) within a duct (not shown) leading to the HRSG. Steam from the HRSG 10 can be supplied to the steam turbine 11, blast furnace 2, carbon dioxide removal system 13, shift reactor 14, among other uses. If desired, the aspects of the FIG. 3 such as the shift reactor 14 can also be incorporated into the system illustrated in FIG. 4.

Figure 5:
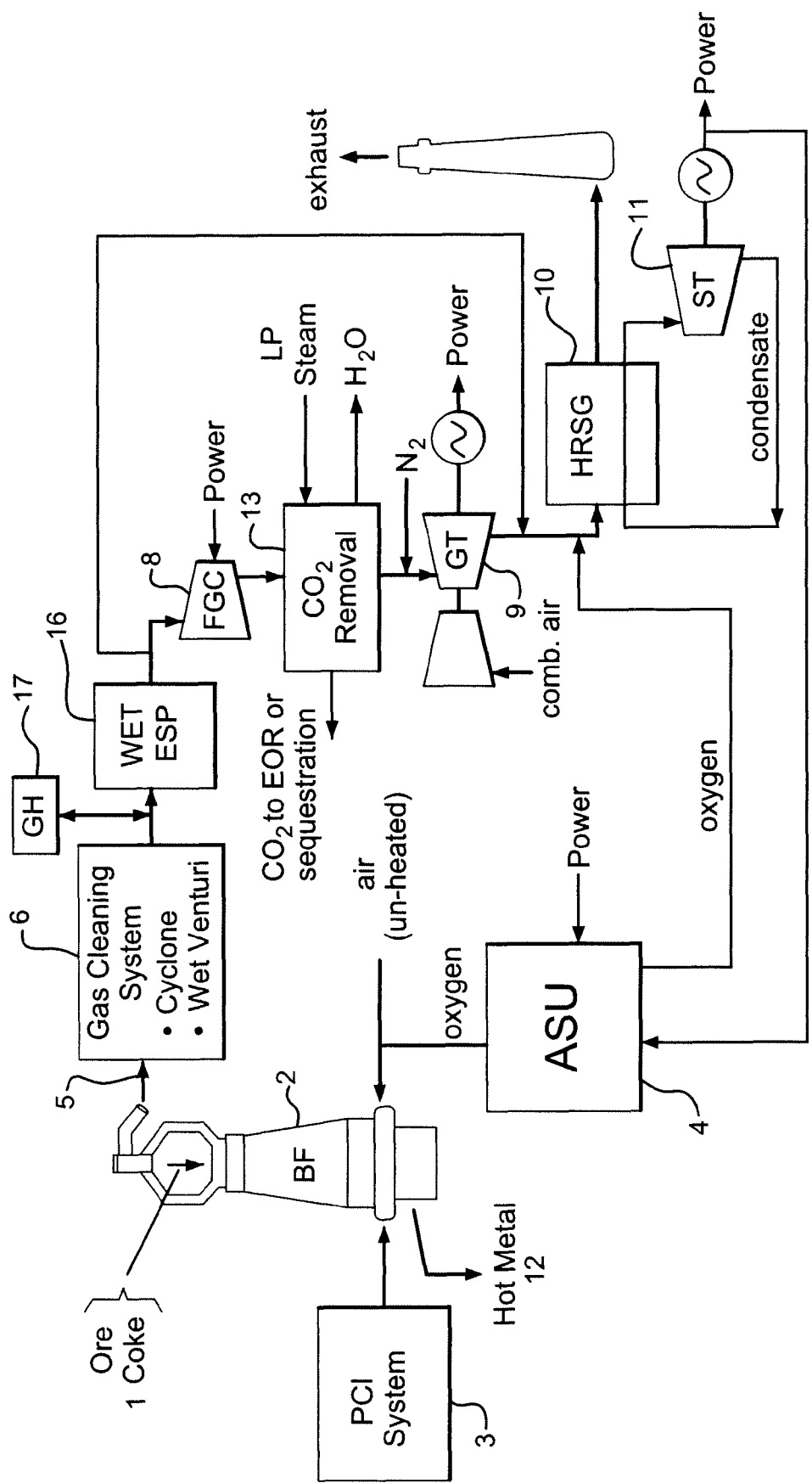
FIG. 5 is a schematic illustration of further aspect of the invention that employs a gas holder to dampen flow and pressure variations in the top gas, and where at least a portion of the treated top gas is directed around the gas turbine to the HRSG.

FIG. 5 illustrates another aspect of the invention wherein the system of FIG. 2 employs a gas holder 17. The gas exiting the wet ESP 16 is supplied to the FGC 8 and, if desired, to the HRSG 10 and combusted therein using oxygen supplied by the ASU 4. Examples of wet ESP systems are disclosed in U.S. Pat. Nos. 7,318,857; 6,294,003; 6,110,256; 5,039,318; 5,084,072; and 4074983; hereby incorporated by reference. Steam from HRSG is supplied to the steam turbine 11 from generating power which can be used, for example, for operating the ASU 4. If desired, the aspects of FIGS. 3 and 4 such as the shift reactor 14 can also be incorporated into the system illustrated in FIG. 5.

Figure 6:
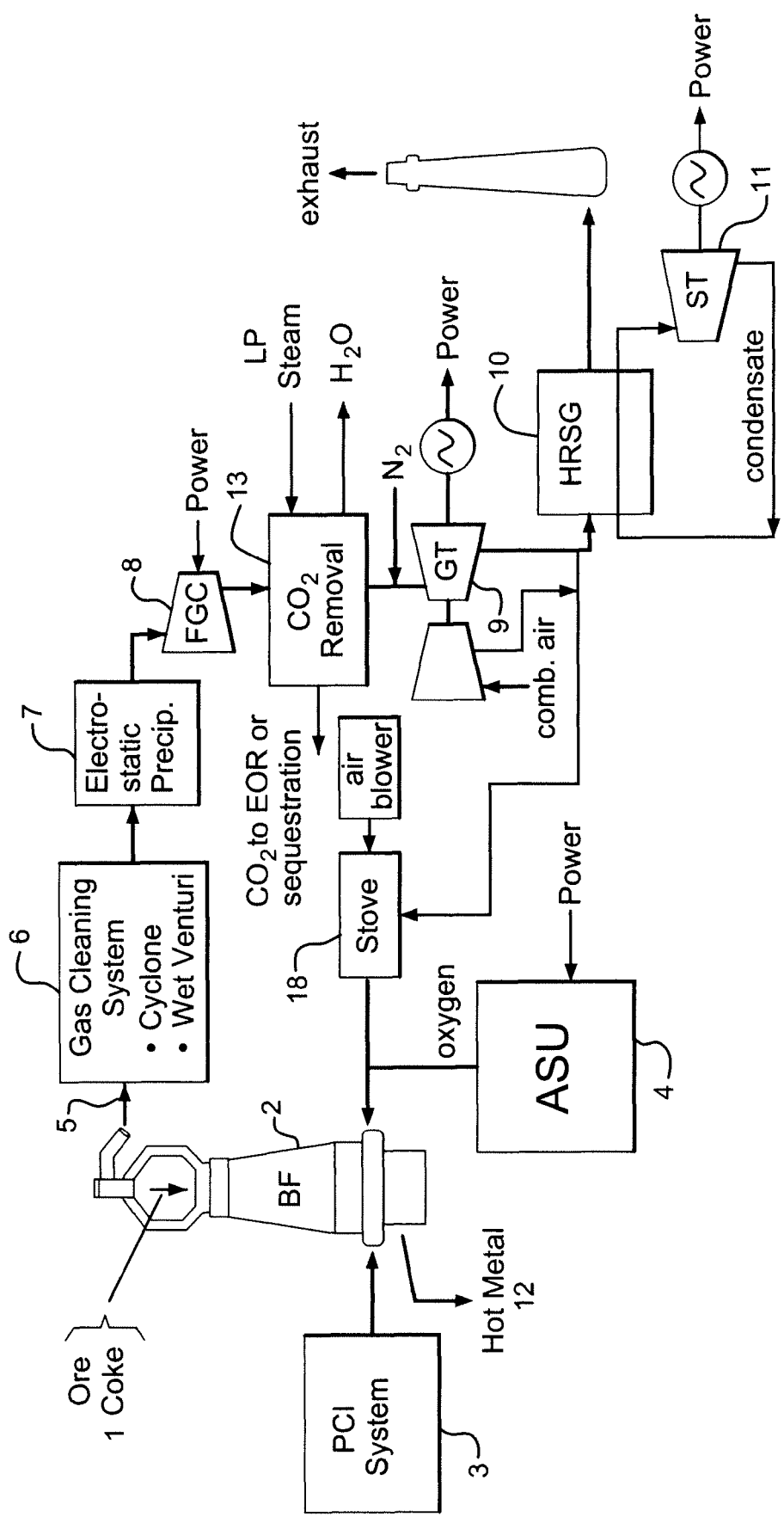
FIG. 6 is a schematic illustration of one aspect of the invention that employs stoves to provide a blast wherein a portion of the blast is provided by i) air extracted from the compressor feeding combustion air to the gas turbine, ii) exhaust from the gas turbine, or iii) both.

FIG. 6 illustrates another aspect of the invention wherein the system of FIG. 2 employs a stove 18 for generating a hot blast that is provided to the blast furnace 12. At least a portion of the blast air can be provided by compressed air extracted from the combustion air compressor for the gas turbine 9. An advantage derives here because the compressed air will already be somewhat heated by the act of compression, and use of this compressed air in feed to the stoves reduces both the thermal energy input needs of the stoves as well as some of the power needs of the blowers used to create the blast. The gas exiting the gas turbine 9 can be controlled in order to optimize the value of supplying the gas to the stove 18 or the HRSG 10, or both. If desired, in addition to or instead of compress air from the gas turbine compressor, hot exhaust from the gas turbine can be supplied to the stoves. Exhaust from the gas turbine is useful in the stoves since the exhaust has an enthalpy value which can reduce the fuel consumed in the stoves. Gas turbine exhaust can also contain oxygen which can be used in the blast furnace.

While the invention has been described in certain aspects, it is understood that the invention is not limited to such aspects and the invention covers various modifications and equivalents included within the scope of the appended claims.

The invention claimed is:
1. A method for producing iron comprising:
   introducing iron ore, coke and coal into a blast furnace, whereby the coal is gasified in the presence of steam and super-enriched air that are introduced into a blast furnace, recovering from the blast furnace a top gas comprising carbon monoxide, carbon dioxide, hydrogen, and nitrogen and using the top gas to generate power; and, recovering hot metal from the blast furnace; wherein the super enriched air is introduced into the blast furnace at a temperature of less than about 850 C and hot metal is produced at a fuel to iron ratio of greater than or equal to about 0.5 kg of carbon per kg of iron produced; wherein the super-enriched air comprises about 32 to about 70 molar percent oxygen.

2. The method of claim 1 wherein the air is enriched with oxygen from at least one member selected from the group consisting of an air separation unit, ion transport membrane and a pressure vacuum swing adsorption (PVSA).

3. The method of claim 2 wherein the air separation unit comprises a cryogenic distillation air separation unit.

4. The method of claim 1 further comprising removing carbon dioxide from the top gas prior to said using.

5. The method of claim 1 wherein the air blast is super-enriched with oxygen to a level above about 40% oxygen.

6. The method of claim 1 wherein the usage of coke is less than about 300 kg per metric ton of hot metal and the coal rate is at least about 200 kg of coal per metric ton of hot metal.

7. A method for generating power comprising:
providing at least a portion of a top gas from an iron producing blast furnace wherein the top gas comprises carbon monoxide, carbon dioxide, hydrogen, and nitrogen each in concentrations such that the top gas has a calorific value greater than about 110 btu/scf,
compressing the top gas,
removing carbon dioxide from the compressed top gas,
supplying the top gas to the gas turbine, and;
introducing an exhaust from the gas turbine into a heat recovery steam generator under conditions sufficient to operate a steam turbine.

8. The method of claim 7 wherein the compressed gas supplied to the gas turbine is combined with nitrogen.

9. The method of claim 8 wherein: i) the nitrogen is generated by an air separation unit (ASU) that supplies oxygen into the blast furnace, and/or ii) oxygen obtained from said ASU is used to combust a portion of the blast furnace top gas at a heat recovery steam generator (HRSG) and/or iii) nitrogen from the ASU is supplied to the gas turbine.

10. The method of claim 7 wherein an exhaust exiting the steam turbine is substantially free of CO2.

11. The method of claim 7 wherein at least a portion of the topgas is combusted in the presence of oxygen from an ASU in a burner of the heat recovery steam generator.

12. A method for producing iron and gasifying coal comprising:
introducing iron bearing materials, and coke into a blast furnace, introducing coal into the iron blast furnace, and;
introducing air enriched in oxygen into the blast furnace,
wherein the conditions within the blast furnace are sufficient to produce iron and convert at least a portion of the coal into a gas comprising carbon monoxide, carbon dioxide and hydrogen;
removing at least a portion of the carbon dioxide from the gas and supplying the gas to at least one of: i) a combined cycle power generation system and supplying steam generated by the combined cycle power generation system to the blast furnace, and ii) a water shift reactor to produce hydrogen;
recovering iron from the iron blast furnace; and,
wherein the method is conducted in a system comprising:
an iron blast furnace and a top gas system for receiving the top gas from the iron blast furnace,
a coal delivery system that supplies coal to the iron blast furnace,
a carbon dioxide removal system that removes carbon dioxide from gas received from the top gas system,
a combined cycle power generation system,
a steam delivery system for supplying, steam from the combined cycle power generation system to the iron blast furnace; and,
an air separation unit and a delivering system for supplying oxygen from the unit to the blast furnace and nitrogen from the unit to the combined cycle power generation system.

13. The method of claim 12 wherein the gas is supplied to a shift reactor wherein carbon monoxide and water are converted into carbon dioxide and hydrogen.

14. The method of claim 12 wherein the air separation unit also supplies nitrogen and the nitrogen is supplied to at least one of the CO2 removing step and a combined cycle power generation system.

15. The method of claim 12 where the furnace is supplied with a mixture comprising oxygen, steam and at least one of CO, CO2 and H2, and the gas is substantially free of nitrogen.

16. The method of claim 12 further comprising a water shift reactor that receives top gas from the top gas system and generates hydrogen.

17. A method for generating power comprising:
providing at least a portion of a top gas from an iron producing blast furnace wherein the top gas comprises carbon monoxide, carbon dioxide, hydrogen, and nitrogen each in concentrations such that the top gas has a calorific value greater than about 110 btu/scf, compressing and supplying the top gas to the gas turbine, and;
introducing an exhaust from the gas turbine into a heat recovery steam generator under conditions sufficient to operate a steam turbine; wherein an exhaust exiting the steam turbine is substantially free of CO2.

18. The method of claim 17 further comprising removing carbon dioxide from the top gas prior to introducing the gas into a gas turbine.

19. The method of claim 18 further comprising converting at least a portion of the carbon monoxide into carbon dioxide prior to said removing carbon dioxide.

20. A method for generating power comprising:
providing at least a portion of a top gas from an iron producing blast furnace wherein the top gas comprises carbon monoxide, carbon dioxide, hydrogen, and nitrogen each in concentrations such that the top gas has a calorific value greater than about 110 btu/scf, compressing and supplying the top gas to the gas turbine, and;
introducing an exhaust from the gas turbine into a heat recovery steam generator under conditions sufficient to operate a steam turbine; wherein at least a portion of the topgas is combusted in the presence of oxygen from an ASU in a burner of the heat recovery steam generator.

* * * * *